United States Patent
Lee

(10) Patent No.: US 7,784,066 B2
(45) Date of Patent: Aug. 24, 2010

(54) AUTOMATIC DISC EJECT DEVICE FOR A DISC-LOADING TRAY OF AN OPTICAL DISC DRIVE

(76) Inventor: Shu-Yuan Lee, 10F., No21., Sec. 1, Minsheng Rd., Banciao City, Taipei Country 22069 (TW)

( * ) Notice: Subject to any disclaimer, the term of this patent is extended or adjusted under 35 U.S.C. 154(b) by 527 days.

(21) Appl. No.: 11/771,084

(22) Filed: Jun. 29, 2007

(65) Prior Publication Data

US 2009/0003145 A1 Jan. 1, 2009

(51) Int. Cl.
*G11B 33/02* (2006.01)

(52) U.S. Cl. .................................................. 720/601

(58) Field of Classification Search .................. None
See application file for complete search history.

(56) References Cited

U.S. PATENT DOCUMENTS

| 5,831,958 | A  | * | 11/1998 | Kurita ......................... 720/637 |
| 6,081,494 | A  | * | 6/2000  | Morimoto et al. ........... 720/632 |
| 6,178,149 | B1 | * | 1/2001  | Nakamura et al. .......... 720/638 |
| 6,618,341 | B1 | * | 9/2003  | Yamashita et al. .......... 720/621 |

* cited by examiner

*Primary Examiner*—Mark Blouin

(57) ABSTRACT

An automatic disc eject device for a disc-loading tray of an optical disc drive comprises: a disc-loading frame, a movable disc-loading piece and a pivot. The movable disc-loading piece is connected to the disc-loading frame by a pivot to form a disc-loading tray. When ejecting the disc, the movable disc-loading piece rotates downward about the pivot to allow the optical disc to fall by gravity without having to take the disc out of the disc-loading tray manually. Therefore, the automatic disc eject device can improve the disc-burning efficiency and speed, reduce the labor consumption and improve the productivity.

1 Claim, 6 Drawing Sheets

AUTOMATIC DISC EJECT DEVICE FOR A DISC-LOADING TRAY OF AN OPTICAL DISC DRIVE

BACKGROUND OF THE INVENTION

1. Field of the Invention

The present invention relates to a disc eject device, and more particularly to automatic disc eject device for a disc-loading tray of an optical disc drive.

2. Description of the Prior Art

With more and more digital data being used in daily life, data are usually stored in an optical disc, and the recording of the data into the optical disc should be achieved by burning. And normally, the optical disc is taken out manually of the burner after the burning process is done. However, in a place where a large quantity of discs need to be burned, such as in a disc manufacturing factory, the method of manually taking out the optical disc is not only labor consuming but low efficient, and is unsuitable for mass production.

To solve the abovementioned problem, the inventor of the present invention, based on the skills and experiences accumulated in the optical disc drive filed, has invented an automatic disc eject device for a disc-loading tray of an optical disc drive.

The present invention has arisen to mitigate and/or obviate the afore-described disadvantages.

SUMMARY OF THE INVENTION

The primary objective of the present invention is to provide an automatic disc eject device for a disc-loading tray of an optical disc drive, which is capable of ejecting the burned disc and transporting it to a conveyor belt, thus improving the disc-burning efficiency and speed.

An automatic disc eject device for a disc-loading tray of an optical disc drive in accordance with the present invention comprises: a disc-loading frame, a movable disc-loading piece and a pivot. The movable disc-loading piece is connected to the disc-loading frame by a pivot to form a disc-loading tray. When ejecting the disc, the movable disc-loading piece rotates downward about the pivot to allow the optical disc to fall by gravity without having to take the disc out of the disc-loading tray manually. Therefore, the automatic disc eject device can improve the disc-burning efficiency and speed, reduce the labor consumption and improve the productivity.

The above automatic disc eject device further comprises a push rod in contact with the movable disc-loading tray and a motor connected to the push rod. Motor controls the pivoting motion of the movable disc-loading piece by rotating the push rod, so as to achieve an automatic operation.

Therefore, the automatic disc eject device can improve the disc-burning efficiency and speed, reduce the labor consumption and improve the productivity.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
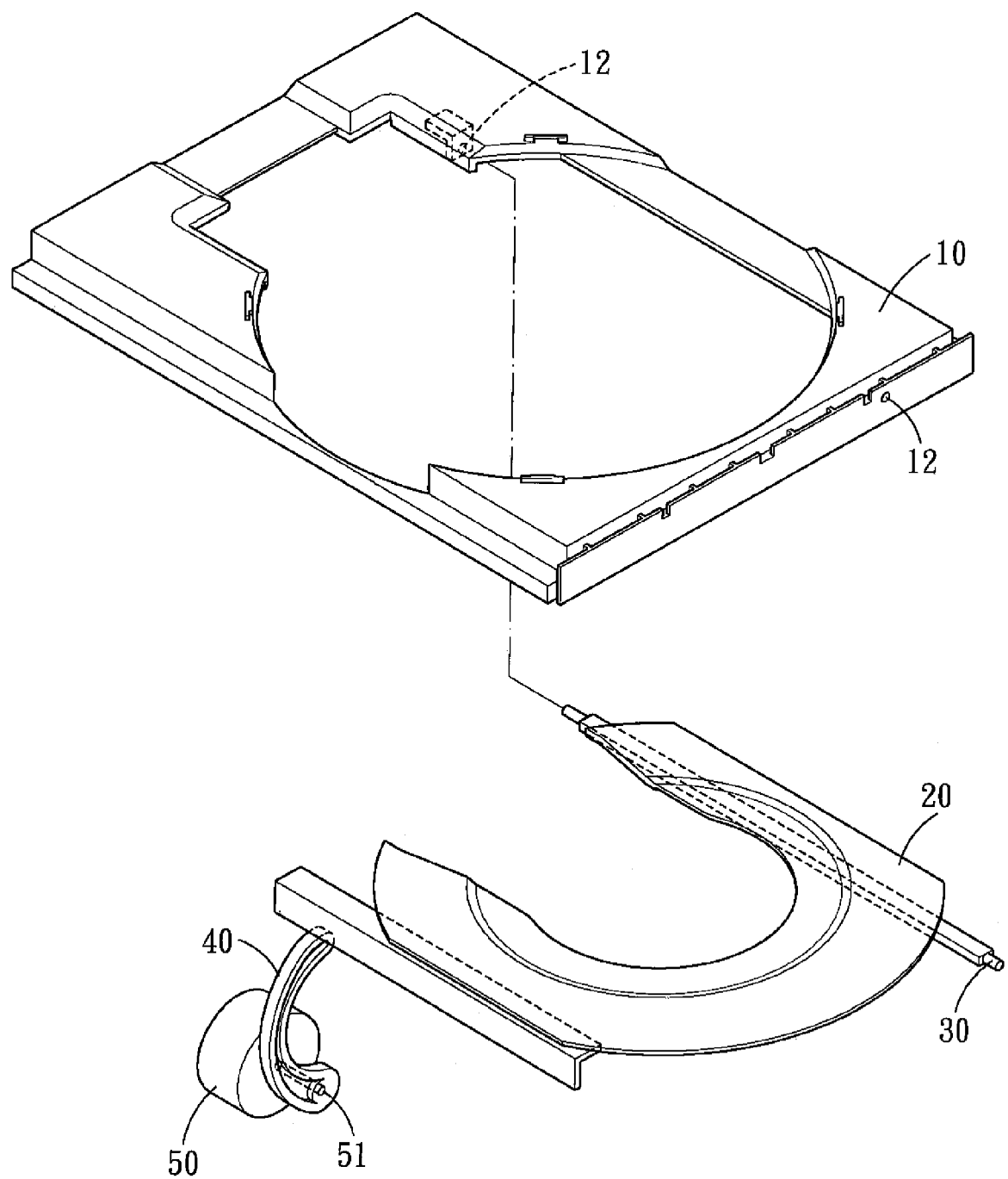
FIG. 1 is an exploded view of an automatic disc eject device for a disc-loading tray of an optical disc drive in accordance with the present invention.
Figure 2:
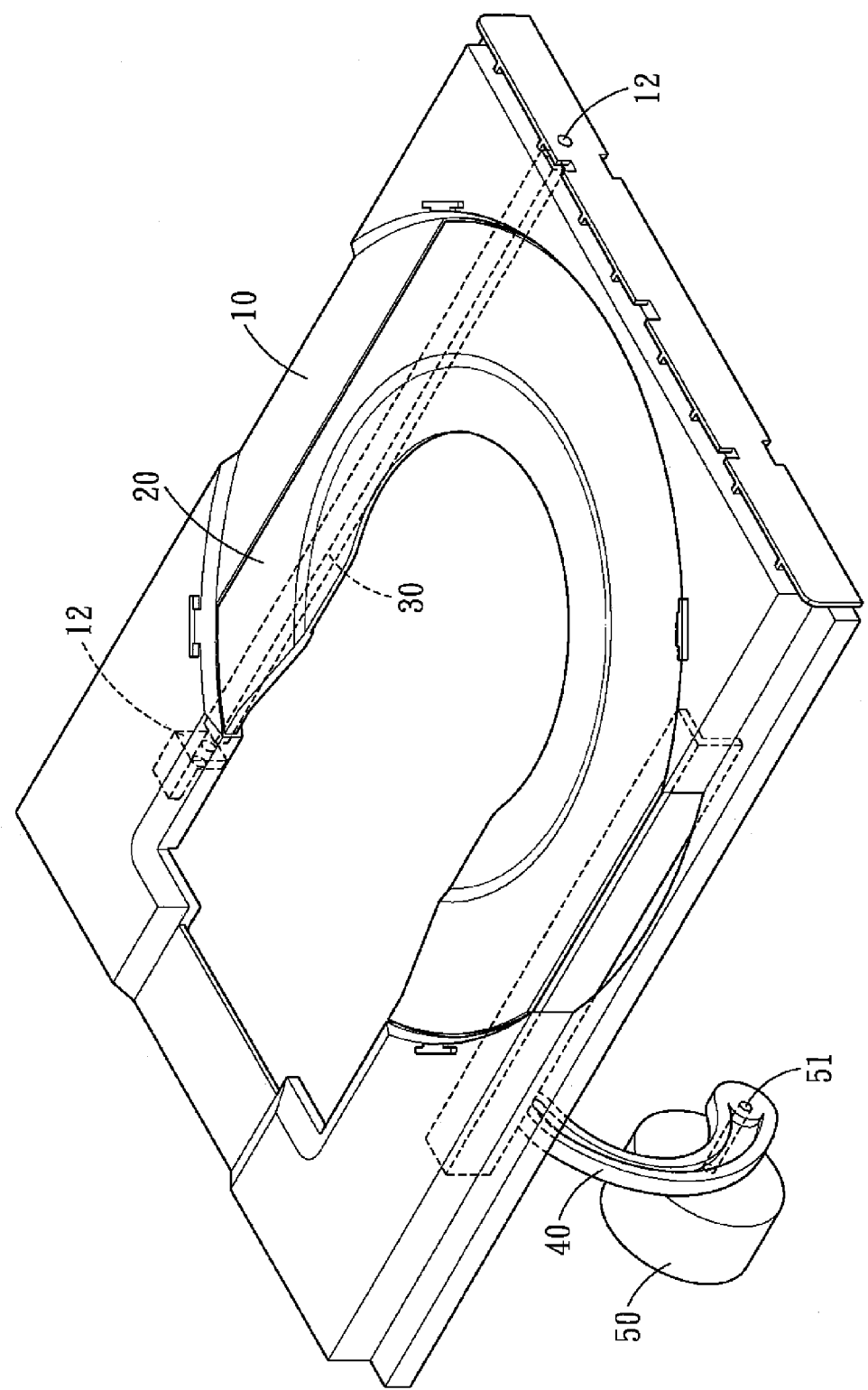
FIG. 2 is a perspective view of the automatic disc eject device for a disc-loading tray of an optical disc drive in accordance with the present invention.
Figure 3:
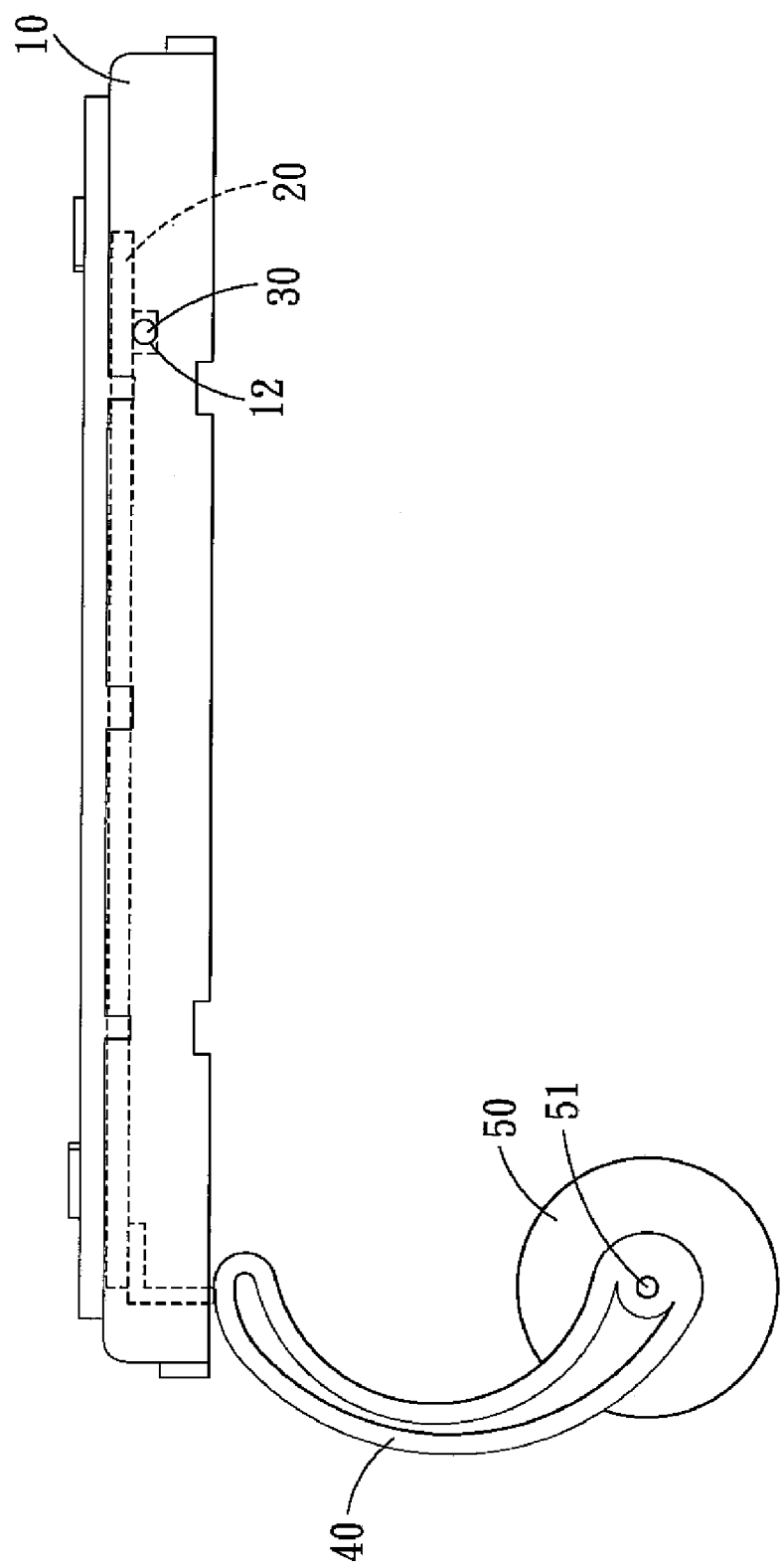
FIG. 3 is a side view of the automatic disc eject device for a disc-loading tray of an optical disc drive in accordance with the present invention.

Referring to FIGS. 1-3, a preferred embodiment of an automatic disc eject device for a disc-loading tray of an optical disc drive in accordance with the present invention is shown and comprises: a disc-loading frame 10, a movable disc-loading piece 20, a pivot 30, a push rod 40, and a motor 50.

At the lower portion of the disc-loading frame 10 are defined two pivot holes 12 for insertion of the pivot 30 and are shaped correspondingly to the shape of both ends of the pivot 30, and both ends of the pivot 30 are rotatably inserted in the pivot holes 12. The disc-loading frame 10 moves in and out of a disc burner to transport the optical disc to be burned, its technique and related structure are of conventional; therefore, further explanations are omitted here.

The movable disc-loading piece 20 is fixed to the lower portion of the disc-loading frame 10 through the pivot 30, and the combined structure of the movable disc-loading piece 20 and the disc-loading frame 10 is the same as the conventional optical disc-loading tray and can move in and out of a disc burner to transport the optical disc to be burned.

The push rod 40 is fixed to the rotary shaft 51 of the motor 50 and located under the movable disc-loading piece 20, and the push rod 40 can fix the movable disc-loading piece 20 and the disc-loading frame 10 in a closed position, so as to prevent the disc loaded therein from falling off. The motor 50 can be fixed to the disc burner.

Figure 4:
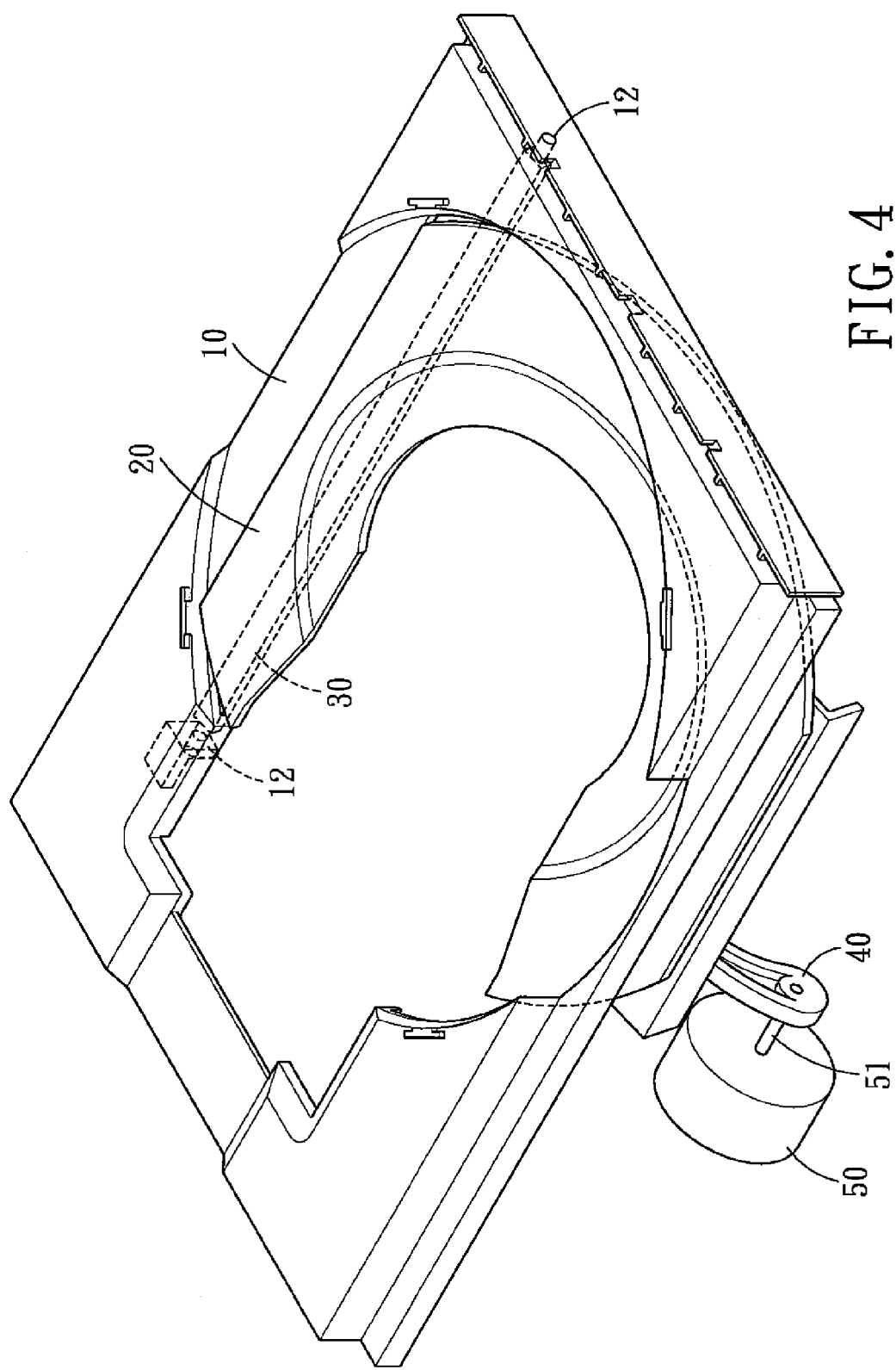
FIG. 4 is a perspective view of the operation state of the automatic disc eject device for a disc-loading tray of an optical disc drive in accordance with the present invention.
Figure 5:
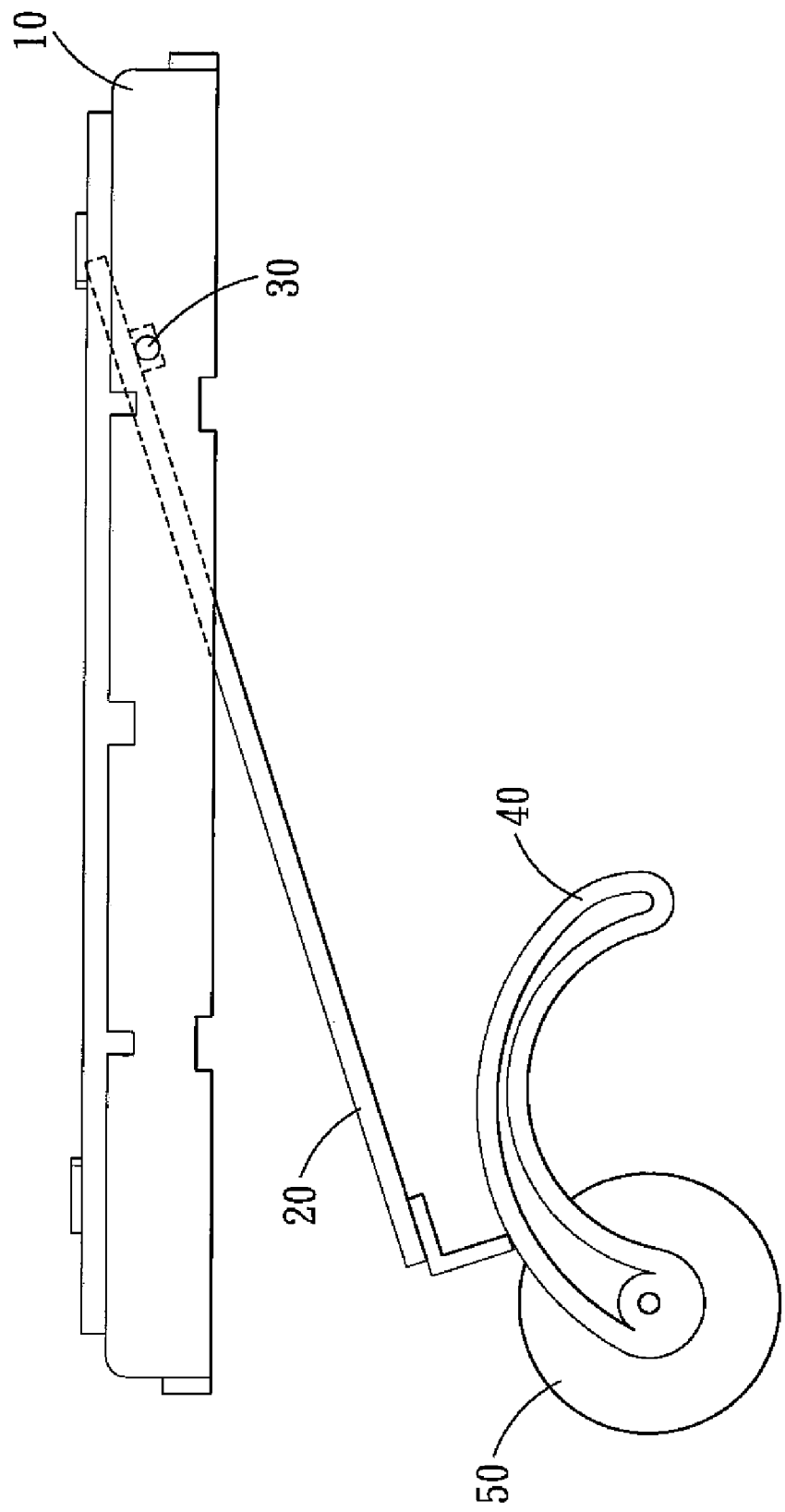
FIG. 5 is a side view of the operation state of the automatic disc eject device for a disc-loading tray of an optical disc drive in accordance with the present invention.

The disc-loading frame 10 (with reference to FIGS. 4 and 5 at the same time) is connected to the movable disc-loading piece 20 through the pivot 30.

The movable disc-loading piece 20 is also in contact with the push rod 40.

In the closed position, the disc-loading frame 10 and the movable disc-loading piece 20 of the optical disc-loading tray of the present invention can perform the disc-loading function and the burning operation.

When the automatic disc eject device of the present invention is in operation, the motor 5 receives a signal, which can be obtained through an electric limit switch or a photoelectric switch (this technology is not within the scope of the present invention, so further explanations are omitted here), to rotate the push rod 40 clockwise to the position shown in the figures (with reference to FIGS. 3 and 4), so that the movable disc-loading piece 20 rotates counterclockwise about the pivot 30 to produce a gradient clearance with respect to the disc-loading frame 10, thus allowing the optical disc to fall by gravity off the movable disc-loading piece 20. After that, the motor 50 drives the push rod 40 to rotate counterclockwise and makes the movable disc-loading piece 20 return to its original position shown in FIGS. 2 and 3. Since the movable disc-loading piece 20 and the disc-loading frame 10 are never separated before and after the disc loading and burning process since they are rotatably connected to each other through the pivot 30, so that the automatic disc eject device can improve the disc-burning efficiency and speed, reduce the labor consumption and improve the productivity.

Figure 6:
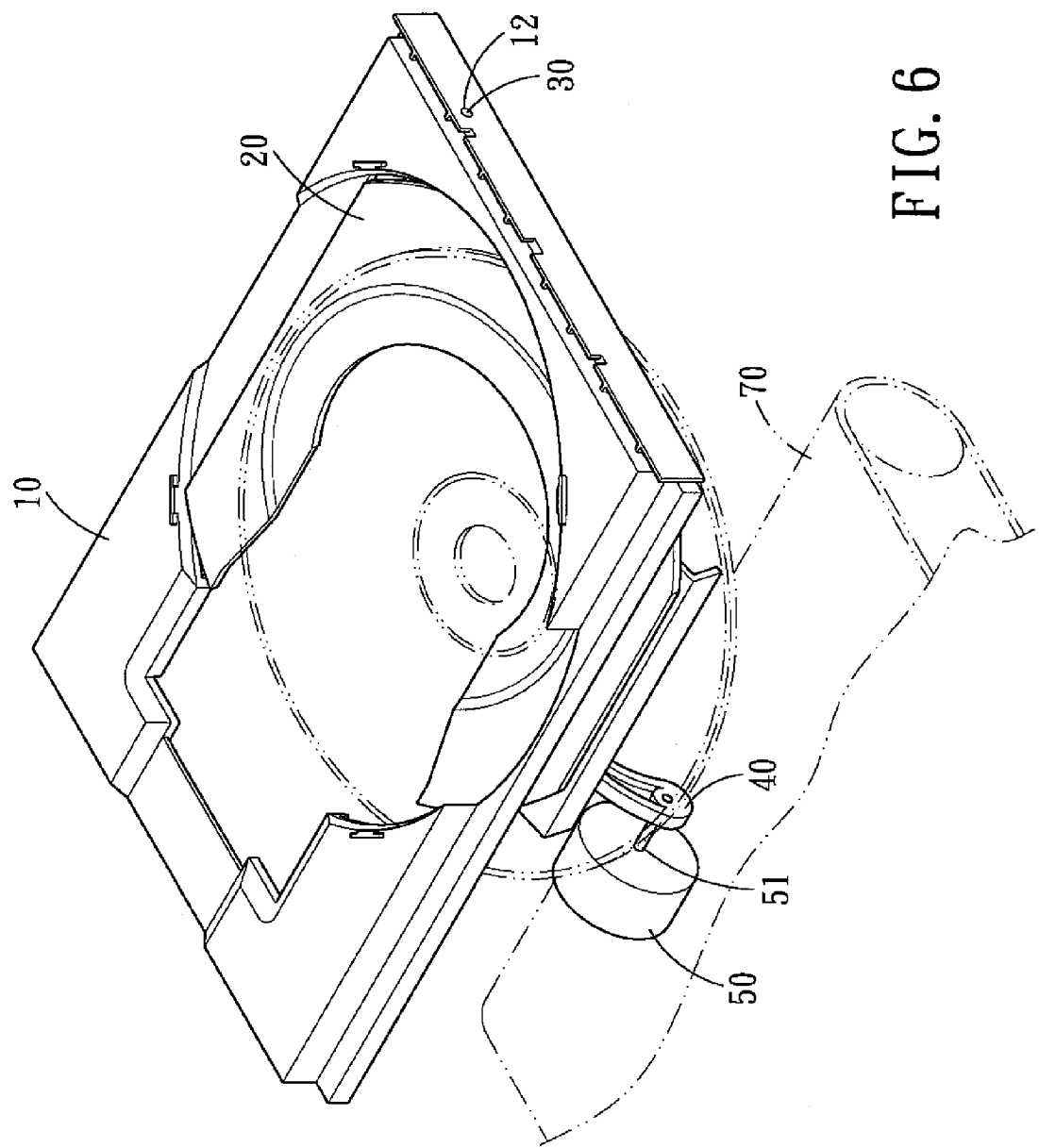
FIG. 6 shows that the automatic disc eject device in accordance with the present invention is used together with a convey belt.

As shown in FIG. 6, a conveyor belt 70 can be disposed under the movable disc-loading piece 20 to create a production line.

To summarize, an automatic disc eject device for a disc-loading tray of an optical disc drive in accordance with the present invention comprises: a disc-loading frame, a movable disc-loading piece and a pivot. The movable disc-loading piece is connected to the disc-loading frame by a pivot to form a disc-loading tray. When ejecting the disc, the movable disc-loading piece rotates downward about the pivot to allow the optical disc to fall by gravity without having to take the disc out of the disc-loading tray manually. Therefore, the automatic disc eject device can improve the disc-burning efficiency and speed, reduce the labor consumption and improve the productivity.

While we have shown and described various embodiments in accordance with the present invention, it is clear to those skilled in the art that further embodiments may be made without departing from the scope of the present invention.

What is claimed is:

1. An automatic disc eject device for a disc-loading tray of an optical disc drive comprising:
    a disc-loading frame (10), having two pivot holes (12);
    a movable disc-loading piece (20), being disposed on the disc-loading frame (10);
    a pivot (30), having both ends rotatably inserted in the pivot holes (12), so that movable disc-loading piece (20) is fixed to the disc-loading frame (10) through the pivot (30);
    a push rod (40), being connected to the movable disc-loading piece (20) and capable of fixing the movable disc-loading piece (20) and the disc loading frame (10) in a closed position, so as to prevent a disc loaded therein from falling off;
    a rotary shaft (51), being connected to the push rod (40); and
    a motor (50), being connected to the rotary shaft (51);
    wherein when the motor (50) receives a signal and rotates the push rod (40) clockwise, the movable disc-loading piece (20) rotating counterclockwise about the pivot (30) to produce a gradient clearance with respect to the disc-loading frame (10), thus allowing the disc to fall by gravity off the movable disc-loading piece (20), further that, the motor (50) driving the push rod (40) to rotate counterclockwise and making the movable disc-loading piece (20) return to a original position.

* * * * *